(12) United States Patent
Dieguez Barrientos et al.

(10) Patent No.: US 12,393,012 B2
(45) Date of Patent: Aug. 19, 2025

(54) METHODS AND DEVICE FOR OBTAINING MICROSCOPIC DIGITAL IMAGES

(71) Applicant: UNIVERSITAT DE BARCELONA, Barcelona (ES)

(72) Inventors: Angel Dieguez Barrientos, Collbató Barcelona (ES); Anna Vila Arbones, Collbató Barcelona (ES)

(73) Assignee: UNIVERSITAT DE BARCELONA, Barcelona (ES)

( * ) Notice: Subject to any disclaimer, the term of this patent is extended or adjusted under 35 U.S.C. 154(b) by 76 days.

(21) Appl. No.: 18/575,996

(22) PCT Filed: Jul. 6, 2022

(86) PCT No.: PCT/EP2022/068744
§ 371 (c)(1),
(2) Date: Jan. 2, 2024

(87) PCT Pub. No.: WO2023/280920
PCT Pub. Date: Jan. 12, 2023

(65) Prior Publication Data
US 2024/0310620 A1    Sep. 19, 2024

(30) Foreign Application Priority Data
Jul. 6, 2021 (EP) .................................. 21382606

(51) Int. Cl.
*G02B 21/36* (2006.01)
*G02B 21/00* (2006.01)
*G02B 21/26* (2006.01)

(52) U.S. Cl.
CPC ....... *G02B 21/367* (2013.01); *G02B 21/0008* (2013.01); *G02B 21/0032* (2013.01); *G02B 21/26* (2013.01); *G02B 21/365* (2013.01)

(58) Field of Classification Search
CPC .. G02B 21/367; G02B 21/0032; G02B 21/26; G02B 21/365; G02B 21/0008
See application file for complete search history.

(56) References Cited

U.S. PATENT DOCUMENTS 8,624,968 B1    1/2014 Hersee et al.
9,046,680 B2 *  6/2015 Cui .................... G02B 21/0024
(Continued)

FOREIGN PATENT DOCUMENTS

EP    3116036 A1    1/2017

OTHER PUBLICATIONS

International Search Report from corresponding International Application No. PCT/EP2022/068744 mailed on Jan. 2, 2023, 6 pages.

*Primary Examiner* — John R Schnurr
(74) *Attorney, Agent, or Firm* — Tucker Ellis LLP (57) ABSTRACT

Methods and device for obtaining microscopic digital images, using an emission module, a detection module and an observation zone arranged between said modules, the method comprises arranging a sample in said observation zone and:
- determining at least one target light emitter of said emission module;
- determining at least one target detection zone of said detection module each zone corresponding to one target light emitter;
- activating the target light emitter(s) and reading the light detectors of the target detection zone(s);
- determining a plurality of target pixels of said digital image and obtaining each of said target pixels from said reading of said target light detectors;

and, iterating until all the image pixels of said digital image are obtained, thus obtaining said microscopic digital image of said sample.

12 Claims, 8 Drawing Sheets

(56) References Cited

U.S. PATENT DOCUMENTS

| | | | | |
|---|---|---|---|---|
| 9,426,429 B2* | 8/2016 | Zheng | H04N 7/183 |
| 9,591,194 B2* | 3/2017 | Maeda | H04N 23/56 |
| 9,594,019 B1* | 3/2017 | Ludwig | G01N 21/59 |
| 10,520,711 B2* | 12/2019 | Fine | G02B 21/0008 |
| 10,620,234 B2 | 4/2020 | Fine | G02B 21/002 |
| 10,831,008 B2* | 11/2020 | Kleppe | G02B 21/0032 |
| 2009/0218527 A1* | 9/2009 | French | G02B 21/008 |
| | | | 250/578.1 |
| 2011/0094318 A1* | 4/2011 | Hellmich | G02B 21/32 |
| | | | 73/863 |
| 2012/0098950 A1* | 4/2012 | Zheng | H04N 7/183 |
| | | | 348/79 |
| 2012/0223217 A1* | 9/2012 | Zheng | G01N 21/272 |
| | | | 250/215 |
| 2013/0222547 A1* | 8/2013 | Van Rooyen | G02B 21/0004 |
| | | | 438/57 |
| 2014/0092229 A1* | 4/2014 | Ludwig | G02B 21/365 |
| | | | 348/79 |
| 2017/0184498 A1* | 6/2017 | Ludwig | G01N 21/51 |
| 2018/0199409 A1* | 7/2018 | Waag | H10H 20/813 |
| 2018/0210185 A1* | 7/2018 | Kato | G06V 20/698 |
| 2019/0137742 A1* | 5/2019 | Kleppe | G02B 21/0036 |
| 2020/0088984 A1* | 3/2020 | Haase | G02B 21/125 |
| 2020/0240898 A1* | 7/2020 | Leslie | B01L 9/527 |
| 2020/0326525 A1* | 10/2020 | Kumagai | G01N 33/48 |

\* cited by examiner

METHODS AND DEVICE FOR OBTAINING MICROSCOPIC DIGITAL IMAGES

RELATED APPLICATION DATA

This application is a national phase application of International Application No. PCT/EP2022/068744 filed Jul. 6, 2022, which claims priority to EP 21382606.8 filed Jul. 6, 2021. The entireties of the aforementioned applications are incorporated herein by reference.

FIELD OF THE INVENTION

The invention lies in the field of microscopic digital images, in particular by using miniaturized microscopic devices that do not rely on optical components for the magnification of the sample.

In particular, the invention relates to a method for obtaining a microscopic digital image comprising a plurality of pixels, wherein said method makes use of:
- An emission module, comprising a plurality of light emitters.
- A detection module arranged parallel and opposite to said emission module, said detection module comprising a plurality of light detectors.
- An observation zone, arranged between said emission module and said detection module, and configured for receiving a sample.

The method may be executed several times, so that it is possible to obtain different digital images of the same or different samples.

Those skilled in the art will understand that each light detector may comprise a plurality of elements. By the way of a non-limiting example, a colour camera sensor may be used as a detection module, in this case each sensor pixel (which does not necessarily directly correspond to an image pixel), is formed by several components, typically for receiving RGB colours, arranged in a 2D grid or even in different layers. Therefore, in the context of this document and unless otherwise specified, the term light detector refers to the output of the detection module, not necessarily at the internal components.

The invention also relates to a corresponding device for obtaining microscopic digital images that executes the aforementioned method.

This project has received funding from the European Union's Horizon 2020 research and innovation programme under grant agreement No 952135.

This project has received funding from the Ministry of Science and Innovation, the Spanish State Research Agency and the European Regional Development Fund through project PID2019-105714RB-I00.

PRIOR ART

In the field of microscopy, it is known to obtain images taken from devices that do not rely on magnification optics and that comprise a light emission module having a light source, for example, a LED, or a group of LEDs acting as a single lighting element. Opposite to this light source there is a detection module formed by a 2D array of detectors, for example, a camera sensor. The arrangement determined so that the cone of light from the light source illuminates the detection module. A sample is arranged near the detection module in order to have a large field of view and, potentially reducing the diffraction effects. The spatial resolution of the image is determined by the density and number of detectors in the detection module.

Nevertheless, this type of devices has several particularities. First, the separation between the light source and the detection module has to be large enough so that the cone of light can illuminate the required area in a homogeneous way. As an alternative, a lens may be used. In both cases, the resulting device is big and/or heavy. For example, the observation zone normally lies in the range of 8 cm to 10 cm between the emission and detection modules. Besides, the spatial resolution is limited by the detection module, so that, in order to being able to discriminate very small details of the sample, the light detectors of the detection module have to be small and dense enough. This is particularly important if the objective is to cover a large field of view: the detection module has to contain a large number of elements, which also increases the requirements for later processing of the images. Therefore, these microscopes are large, often heavy and rely on complex architectures in order to work, which makes them also expensive to manufacture.

Is therefore needed a method and device able to obtain high quality microscopy digital images but, at the same time, having a reduced manufacturing cost and a resulting in devices that are smaller and lighter than the ones known in the art.

SUMMARY OF THE INVENTION

The invention is aimed to provide a method for obtaining a microscopic digital image of the type stated at the beginning, being able to avoid the problems that have been identified above.

In the context of this document, the emission module may be a monolithic component, or a group of components, by the way of a non-limiting example, a single display, or an arrangement of displays, both options being equivalent. The same applies in the case of the detection module. Components may be arranged independently or even being stitched together.

Those skilled in the art will understand that when referring to light emitters and light detectors, using groups elements instead of individual elements renders to the equivalent effects and results to the ones described herein, therefore, for the sake of clarity and brevity, and unless otherwise specified, it has to be understood that in the description that option is equivalent. In particular, using a group of neighbour LEDs instead of a single LED for emission can be advantageous for providing more light radiation. Likewise, using a group of neighbour light detectors instead of a single light detector can be advantageous for having more sensibility and/or for increasing the signal to noise ratio, SNR, at the cost of decreasing the resolution of the obtained image.

In this context, the emission/detection modules are considered those that are effectively used, even if the physical components are larger or include other elements that are not used in order to form the image.

The purpose of the invention is achieved by a method of the type indicated at the beginning, characterized in that the method comprises arranging said sample in said observation zone and repeating the following steps:
  a) determining at least one target light emitter among said light emitters of said emission module;
  b) determining at least one target detection zone of said detection module, each target detection zone corresponding to one of said at least one target light emitter, and comprising a plurality of target light detectors being the light detectors of said detection module that are arranged in said target detection zone;

c) activating said at least one target light emitter and reading said target light detectors; and d) determining a plurality of target pixels among said pixels of said digital image and obtaining each of said target pixels from said reading of said target light detectors;

wherein an iteration of the method comprises said steps a) to d), so that after a plurality of iterations all the image pixels of said digital image are obtained, thus obtaining said microscopic digital image of said sample.

It is to be understood that steps a) and b) are not necessarily meant to be performed one after the other, for example, for the objective of the invention it may be equivalent to first determine the target detection zones(s) and then the target light emitter(s), or even determine both in parallel. Likewise, the target pixels are obtained after the reading of the target light detectors, but they may be determined together with steps a) and b). The particular restrictions, if any, will be dependent on the particular embodiments of the invention.

Therefore, in each iteration of the method, one or more target light emitters are activated, and several target light detectors are read corresponding to each of said target light emitters. In the case that more than one target light emitter are determined in an iteration, said target light emitters are determined so that they are spaced away, in this way, the interference of light coming from different light emitters is minimized. Using the readings of said target light detectors, several target pixels are obtained. The iterations are repeated until all the pixels of the digital image are obtained, thereby obtaining said digital image. In the context of this document, the term "reading" referring to a light detector has to be understood in its generic form, since the nature of the reading depends on the type of detector used. The most common detectors provide readings that are related to the intensity of the incident light received by said detector. Likewise, the way the readings from the target light detectors are used for obtaining the target pixels may be different depending on the nature of the light detectors and the image that is read. As a non-limiting example, each single target light detector may contain light intensity information that is digitalized in a greyscale pixel value scaling from 0 (black) to 255 (white) and used for a single target pixel that corresponds to said target light detector. In another example, each light detector comprises three elements, each configured to measure the intensity of light in three components, R (red), G (green) and B (blue), also known as trichromacy. In this case, the reading could be considered a trio of values, one for each colour R, G or B, and each digitalized into a respective 0-255 scale. In this case, the obtained pixels might have colour information. Other types of reading may also be envisaged, for example, but not limited to, luminance, light polarization, wavelength, colour saturation, or combinations thereof. In some embodiments, for example, having the detectors that are SPADs (Single Photon Avalanche Diodes), the reading may be related to the total number of photons received during predefined time intervals. The output digital image is thus formed by the readings of each light detector.

The emission module and detection module do not necessarily have the same number of elements and arranged equally. Moreover, the number of target light emitters do not need to match the number of target light detectors. It may also be envisaged that the emission module comprises a large number of light emitters but not all of them are used in the method. Likewise, it may be envisaged that the detection module comprises more light detectors than the total number of light detectors used in the method. In particular, in a preferred embodiment, only a subset of the light emitters of the emission module are determined as target light emitters in the method.

The method described herein has the advantageous technical effect that the resulting image is formed by a plurality of sub-images, each sub-image obtained from the reading of the target light detectors of a target detection zone. Each target detection zone is illuminated by a target light emitter and the final image is thereby obtained by the combination of all the sub-images. The area illuminated by each detector only needs to cover one target detection zone. As a result, the emission module and the detection module may be arranged much closer to each other than in the cases known in the art, thereby resulting in a compact device which does not rely in a complex structure and may therefore have a low manufacturing cost. In particular, with the devices using this method, observation zones are possible. In preferred embodiments where the light emitters are small (5 μm or less, and preferably 1 μm or less), for example, if the emission module is a microdisplay, the spatial coherence is improved which in turn improves image quality.

In a preferred embodiment, the light detection module is a camera sensor, sometimes referred as image sensor, preferably a CCD, CMOS or SPAD sensor, but other equivalent technologies may also be envisaged. The skilled person will understand that a camera sensor comprises light detection elements that form a raw image, but that are usually grouped in elements usually named "pixels". For example, a pixel of the camera sensor may be formed by three elements corresponding to the RGB colours. Some camera sensors have other distributions or other number of elements. In the context of this document and, unless otherwise specified, in the embodiments where a camera sensor is used, the light detectors of the light detection module correspond to the pixels of the camera sensor. The skilled person will understand that the pixels of the digital image do not necessarily correspond to the pixels of the camera sensor, but the former are obtained from the latter.

In another alternative embodiment, the light detection module is not a camera sensor, but it comprises a plurality of light detectors, preferably each light detector comprises at least one Single Photon Avalanche Diode, SPAD. In a preferred embodiment, instead of a single light detector, the method uses groups of light detectors acting as one single light detector. In this case, the resolution may be decreased but the sensitivity and/or the SNR (Signal to Noise Ratio) can be increased for the obtained image.

Preferably, said sample is arranged near to said emission module, in particular closer to the emission module than to the detection module and more preferably in contact with the emission module. A transparent cover for the emission module may also be envisaged, for example, a sample holder made of glass or a transparent polymer. In this case, the sample may be in contact with said transparent cover. In the solutions known in the art, and particularly in the so-called holographic microscopes, historically the sample was arranged in the middle of the observation zone, half-way between the emission module and the detection module. More recently, the sample is typically arranged near the detection module in order to obtain a large field of view while trying to avoid diffraction. The invention described herein overcomes this technical prejudice preferring to arrange the sample near to the emission module. Indeed, it has been observed that when the light emitters are small, spatial coherence is improved. Besides, diffraction effects may even be less severe when the sample is arranged near the emission module, the edges are often crisper and have better definition than in the case where the sample is close to the detection module and, in particular, the diffraction bands are spaced away a greater distance than in the art, which also facilitates the later reconstruction of the image by means of image processing. Moreover, there is a magnification effect that also leads to an increased resolution of small details. This magnification depends on the distance between the emission module and the detection module. The corresponding reduction in the field of view may be compensated by the way the image is composed with the aforementioned sub-images.

Preferably, said target pixels are obtained by further compensating the light fall-off received in said target detectors. For the sake of brevity, the explanation described hereinafter corresponds to the situation where the readings of the light detectors relate to the intensity of the received light and where the digital image is a colour or grayscale image obtained by said readings. Those skilled in the art will have no problems using the same concepts for other similar cases. The light fall-off, sometimes referred as "vignetting", is due to the fact that the light detectors that are closer to the target light emitters receive more intensity of light that the ones in the extremes, because the light has travelled a longer path in the second case. This explanation corresponds to the situation where no sample is arranged in the observation zone. Preferably, compensating the light fall-off is done by means of a previous calibration step wherein the method is performed without a sample arranged in said observation zone, so that the relative value of each pixel of the digital image obtained in said calibration step contains information about said light fall-off. If the emission profile of each light emitter is well known, for example, by a pre-characterization or by means of measures in absence of samples, the readings of the light emitters can be corrected in order to compensate this effect, therefore obtaining a digital image that does not contain unwanted variations of luminance.

Preferably, in each iteration, said at least one target light emitter comprises only one target light emitter, and said at least one target detection zone comprises only one target detection zone, so that, in each iteration, only one target light emitter and only one target detection zone are used. This simplifies the device and is particularly advantageous for avoiding interferences of light between zones.

Preferably, said target detection zone is determined as the same target detection zone in all of said plurality of iterations of the method, so that, the same target detection zone and, therefore, the same target light detectors are re-used in all the iterations of the method, even if different target light emitters are used for different iterations. The determination of the target pixels is done using the relative positions of the target light emitters. This alternative is particularly advantageous in terms of cost, since the detection module used does not need a large amount of light detectors. In fact, the resolution of the digital image depends on the number of light detectors multiplied by the total number of target light emitters used in the method.

In an alternative embodiment, a plurality of target detection zones are determined throughout the method, preferably wherein, in each iteration of the method, a different target detection zone is determined, so that the total number of target detection zones is the same that the total number of iterations of the method. Using different target detection zones reduces the presence of artifacts in the image that may be more prevalent in the case of reusing the same target detection zone for different target light emitters. In an alternative embodiment, in each iteration, said at least one target light emitter comprises a plurality of target light emitters, and said at least one target detection zone comprises a plurality of target detection zones, each of said target detection zone corresponding one-to-one to one of said target light emitter. The target light emitters in each iteration are determined so they are spaced away in order to reduce the interference to neighbouring target detection zones. In this way, in each iteration several target light emitters are activated in the same iteration, and several corresponding target detection zones are read. This embodiment is particularly advantageous in terms of acquisition time. Indeed, the number of iterations required for the method is reduced by a factor of the mean number of target light emitters used in each iteration.

Preferably, the target light emitter corresponding to a target detection zone is centred regarding said target detection zone, so the illumination of the zone is as homogeneous as possible. It is to be understood that, in real life, misalignments might occur, therefore, the term "centred" has to be interpreted in an open meaning, referring to the light emitter that is more centred regarding the target detection zone. Likewise, if the light emitter that has been determined is faulty, it may be discarded and using instead the valid light emitter with is more centred.

Preferably, said detection module comprises M×N light detectors and is divided in P×Q detection zones, each detection zone comprising m×n light detectors, and wherein each of said target detection zones is determined as one of said P×Q detection zones, wherein said digital image comprises M×N pixels, each pixel corresponding to one of said light detectors, so that in each iteration of the method, said plurality of target pixels is determined as the pixels corresponding to said plurality of target light detectors, and each target pixel is obtained from the reading of the corresponding target light detector. Therefore, there is a one-to-one correspondence between the light detectors and the pixels, at least for those that are effectively used by the method. This way, for each detection zone, a sub-image is obtained in each iteration, and the determination of target light detectors, pixels and emitters is simplified following a grid. As is customary in the art, when referring to rectangular arrays the first dimension is often referred as "horizontal" and the second dimension as "vertical", even if the module can be arranged in any position depending on the application.

The invention also refers to a device for obtaining microscopic digital images, characterized in that it comprises:
  an emission module, comprising a plurality of light emitters;
  a detection module arranged parallel and opposite to said emission module, and comprising a plurality of light detectors; and
  an observation zone, arranged between said emission module and said detection module, and configured for receiving a sample;
  a control means, configured for driving the device to execute the method for obtaining a microscopic digital image described above.

Preferably, each light emitter of said light emission module comprises at least one light emitting element, preferably a LED, which are power efficient and can be easily integrated in arrays. Therefore, some preferred embodiments can be envisaged for the emission module, by the way of non-limiting examples, a microdisplay of LEDs or a 2D matrix of LEDs or nano-LEDS, with LEDs that may be even smaller than the wavelength of the light that is emitted.

Preferably, each of said plurality of light detectors comprises at least one photodetector, preferably a Single Photon Avalanche Diode. In an alternative embodiment, said detection module is a camera sensor, preferably a CCD, CMOS or SPAD sensor, but equivalent technologies may be also envisaged.

Preferably, light concentration means are arranged on top of each of said light detectors for concentrating an incident light towards each respective light detector, therefore improving the sensitivity of the device. In a preferred embodiment, said light concentration means are preferably micro-lenses, which are easily arranged over several types of light detection modules. Preferably, light concentration means are arranged on top of each of said light emitters.

In a preferred embodiment, said control means is software-driven, so that it can execute the method by following a set of instructions, being already pre-stored in the device or by means of an external interface, therefore expanding the range of functionalities of the device and, in particular, the particular options that in which the method can be executed for obtaining digital images, thereby improving the flexibility of the device.

In an alternative embodiment, said control means comprise a static predefined sequence stored in-chip, preferably by means of shift registers between the plurality of target light emitters of consecutive iterations of the method for obtaining a microscopic digital image, so that each of the target light emitters in an iteration are activated sequentially from each of the target light emitters in the previous iteration, thus, minimizing the time required for each iteration of the method. Therefore, the device follows a predefined sequence for determining the target light emitters.

Preferably, said emission module comprises a plurality of emission zones, each emission zone comprising a plurality of light emitters, and wherein said control means comprise a shift register for each of said emission zones configured to sequentially activate each of the light emitters of said emission zone. Shift registers or equivalent circuit components may therefore be used, interconnecting the light emitters in the desired sequence. This implementation greatly improves the speed by reducing the time required for each iteration. For example, using a standard microdisplay as an emission module requires that the light emitters to be activated for a particular iteration are "loaded" in the microdisplay controller, similar as when an image is loaded in a computer display. In this advantageous embodiment, instead of the aforementioned step of loading a complete block of information containing an "image" for each iteration, the device may initialize a first plurality of target light emitters in the first iteration and then, all the interconnected light emitters are activated in sequence, potentially with a single digital clock signal.

Preferably, the device further comprises:
- a transporting tape, preferably having a self-adherent side, arranged through said observation zone; and configured for adhering said sample thereto; and
- dragging means, configured for dragging said transporting tape though said observation zone, so that said sample adhered thereto is dragged to said observation zone; wherein said dragging means preferably comprise a roller.

Therefore, the sample is arranged in said observation zone by adhering said sample in the transporting tape and dragged by the tape to the observation zone. It will be evident for those skilled in the art that the transporting tape must be transparent to the type of light emitted by the emission module. This constitutes a convenient and simplified way of arranging the sample to form the image that could otherwise be difficult to arrange given the reduced dimensions of the elements.

In alternative embodiment, the device further comprises suction means, configured for driving said sample to said observation zone by suction, so that the sample is arranged in said observation zone by suction.

Preferably, said observation zone has a volume of a size that allows said sample to freely enter said observation zone. Therefore, it is possible to deploy the device in a place where a sample is present and said sample to be moved to the observation zone, for example, because the sample itself moves or due to environmental effects such air or water streams where the device has been deployed.

Preferably, said device comprises a first plate and a second plate, attached to one another and forming through channel; wherein one of said emission module and said detection module is provided in said first plate and the other of said emission module and said detection module is provided in said second plate, so that said observation zone is located in said through channel. Preferably, at least one of said plates comprises an outer plate and a frame plate, attached to one another, wherein said frame plate comprises a hole for receiving said emission module or say detection module, and a transparent cover between said array and said through channel. These particular embodiments render a device that can be easily manufactured and assembled, and at the same time, have a reduced volume, which is advantageous for storage, handling, and deployment of the device.

The invention also relates to the use of at least one device as disclosed herein for obtaining distributed digital images, wherein said at least one device is deployed in a zone containing samples, and each of said at least one device performs at least one execution of said method for obtaining images, therefore obtaining a plurality of images of samples corresponding to said zone. The devices disclosed in this document have the advantage of being small and having a low production cost, as well as a fast image acquisition. This combination of features renders them particularly well suited to be deployed in a zone, for example an environment area like a pool, a river etc., and used for obtaining microscopic images of the samples that are present in said zone. The devices themselves may be provided with motion means, configured for moving the device in the area, and/or being passive, so that the sample is moved towards the device, for example, due to environmental effects like a water or air stream. This use method is advantageous, for example, in order to monitor the presence and type of micro-organisms in said zone.

It is, therefore, not necessary to take the sample to the microscope as in the known state of the art, instead the microscope is moved to where the sample is.

The resulting plurality of images may be then recovered by recovering the devices and reading their memory files, or alternatively receiving them by wired or wireless means from the devices.

The obtained digital image or images may be processed in a later stage, for example, by using stitching methods in order to join together the sub-images obtained in different iterations of the method in a final image. The skilled person will understand that using a complete image formed by segmented sub-images or using the sub-images themselves and their relative positions are alternatives options leading to the same result.

The invention also includes other detail features illustrated in the detailed description of some embodiments of the invention and in the accompanying figures.

BRIEF DESCRIPTION OF THE FIGURES

Further advantages and features of the invention will become apparent from the following description, in which, without any limiting character, preferred embodiments of the invention are disclosed, in reference to the accompanying figures:

FIGS. 6A and 6B correspond to the first and second iteration, and FIG. 6C corresponds to the $12^{th}$ iteration.

DETAILED DESCRIPTION OF EMBODIMENTS O THE INVENTION

Figure 1:
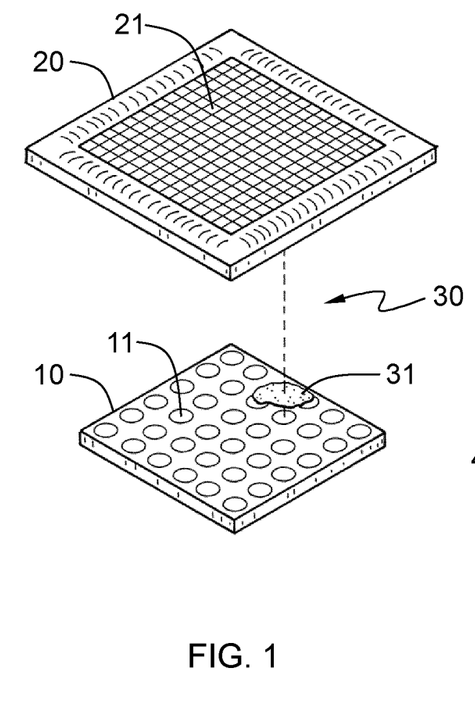
FIG. 1 is a schematic perspective view of an emission module and a detection module in a device for obtaining microscopic digital images, wherein the density of light detectors is higher than the density of light emitters.
Figure 2:
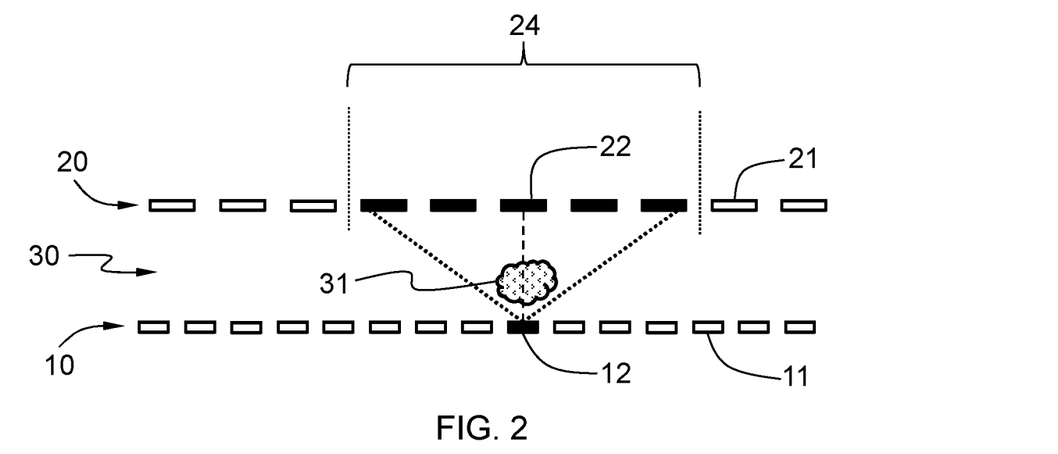
FIG. 2 is a schematic lateral view of an emission module and a detection module used in another device for obtaining microscopic digital images, wherein the density of light detectors is lower than the density of light emitters.

FIG. 1 and FIG. 2 are simplified representations of some components of devices for obtaining microscopic digital images. Both are only abstract representations of the elements that have been simplified for the sake of clarity, for example, the figures are not at scale, the distances between elements have been exaggerated as well as the size of each emitter and detector, and only a few pixels are shown. Likewise, the size of the observation zone 30 has been exaggerated in the figures, and the sample 31 is represented as a small spot. The dashed vertical lines in FIG. 1 and FIG. 2 represent the path that joins a particular target light emitter 12 with the centre of the corresponding target detector zone 24. The dotted diagonal lines in FIG. 2 represent the cone of light emitted by a light emitter 12, which is a simplification of the solid angle of the beam of light. FIG. 1 is an example wherein the density of light detectors is higher than the density of light emitters, and FIG. 2 shows the opposite situation, wherein the density of light detectors is lower than the density of light emitters. In FIG. 1, in order to show the light detectors 21, the detection module 20 has been represented as transparent, so that the light detectors 21 can also be seen from above. Nevertheless, said light detectors 21 are in fact arranged in the lower side of the detection module 20, opposite the emission module 10.

Figures 4, 5A:
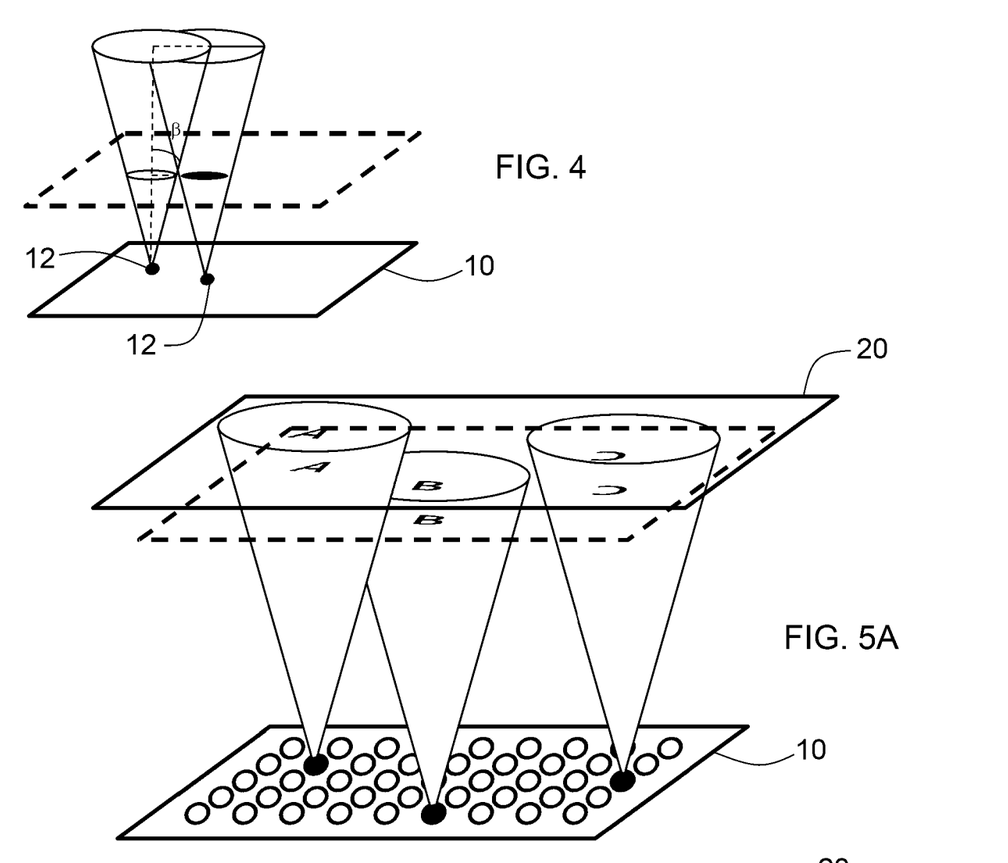
FIG. 4 is a schematic diagram showing the interference of the beams of light between light emitters depending on the distance to the sample.
FIG. 5A is a schematic diagram of the magnification effect when the sample is near the detector module.

FIG. 4 is a simplified diagram showing the interference of light coming between neighbouring target light emitters 12. It will be clear for the skilled person how to determine the distance between light emitters depending on the angle of the beam and the distance to the sample 31 and/or to the detection module 20.

Figure 5B:
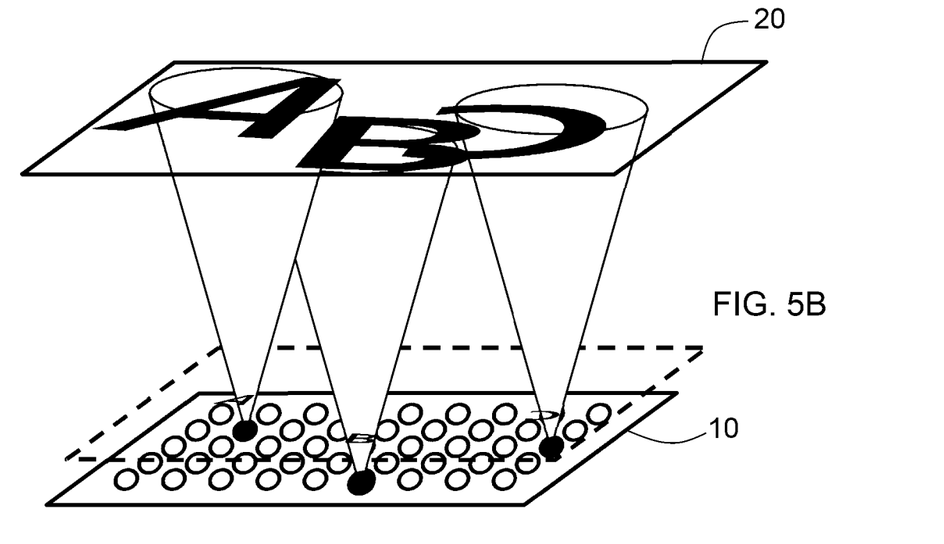
FIG. 5B is a schematic diagram of the magnification effect when the sample is near the emission module.

FIG. 5A and FIG. 5B are simplified diagrams of the magnification effect of arranging the sample 31 near to the detection module, as in FIG. 5A, or near the emission module, as in FIG. 5B. Letters A, B and C have been used as a reference, but the figure is only a qualitative diagram, and it is not at scale.

Figure 3:
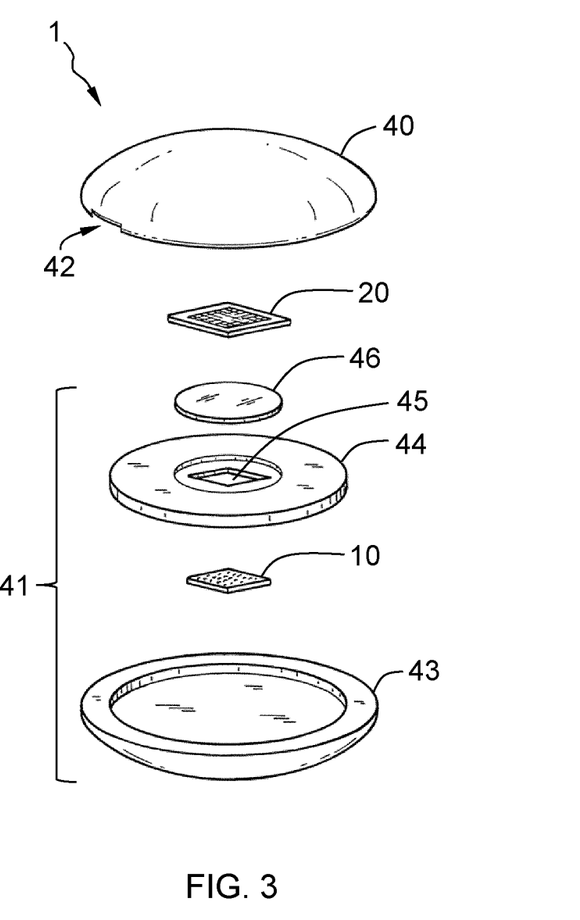
FIG. 3 is an exploded view of an exemplary embodiment of a device for obtaining microscopic digital images according to the invention.

FIG. 3 shows a first exemplary embodiment of a device 1 for obtaining microscopic digital images according to the invention. The device 1 has an emission module 10, having a plurality of light emitters 11, and a detection module 20 arranged parallel and opposite to the emission module 10, and comprising a plurality of light detectors 21. An observation zone 30 is arranged between the emission module 10 and the detection module 20, and configured for receiving a sample 31. The arrangement of the modules 10, 20 and the observation zone 30 is the same than in FIG. 1 and FIG. 2.

In the first embodiment, each light emitter 11 is a LED having a size of 1 μm. The detection module 10 is an 8-bit grayscale CMOS camera sensor, so that each light detector 21 is a sensor pixel having a value between 0 and 255. Other embodiments can be envisaged where each light emitter 11 and/or each light detector 21 is a plurality of elements. In particular, for the first embodiment, the detection module 20 has M×N light detectors and is divided in P×Q detection zones 23, each detection zone 23 comprising m×n light detectors, and wherein each of said target detection zones 24 is determined as one of said P×Q detection zones 23. The digital image also has M×N pixels, each pixel corresponding one-to-one to one of the light detectors 21. In particular, the detection module 20 has 2100×2100 sensor pixels, divided in 7×7 detection zones 23, so that each detection zone 23 has 300×300 sensor pixels and the digital image also has 2100×2100 pixels that are obtained in blocks of 300×300. Different module sizes and distribution may be also envisaged, the ones used here are only an exemplary and non-limiting example. The skilled person will understand that these numbers will be impossible to represent in the figures so, for the sake of clarity, all the figures showing details of the emission module 10 and/or detection module 20 are only abstract and simplified representations. In particular, very few elements are shown, and the size, form and distribution of each element does not correspond with real devices.

The device 1 comprises a first plate 40 and a second plate 41, attached to one another and forming through channel 42. The detection module 20 is provided in the first plate 40 and the emission module 10 is provided in the second plate 41, but the reverse combination may also be envisaged. The observation zone 30 is located in the through channel 42. In particular, the second plate 41 has an outer plate 43 and a frame plate 44, attached to one another. Said frame plate 44 has a hole 45 for receiving the emission module 10 and a transparent cover 46 between said emission module 10 the through channel 42. In the first embodiment, the through channel 42 and the observation zone 30 have a volume of a size that allows the samples 31 to freely enter said observation zone 30. With the device 1 arranged in vertical, due to the gravitation, the sample 31 is generally arranged near to said emission module 10, in contact to the transparent cover 46.

The device 1 is also provided with control means, not shown in FIG. 3. Said control means is configured for driving the device 1 to execute a method for obtaining a digital image from a sample 31 arranged in the observation zone 30. The method comprises repeating the following steps:
 a) Determining at least one target light emitter 12 among the light emitters 11 of the emission module 10.
 b) Determining at least one target detection zone 24 of the detection module 20, each target detection zone 24 corresponding to one of said at least one target light emitter 12, and comprising a plurality of target light detectors 22 being the light detectors 21 of the detection module 20 that are arranged in said target detection zone 24.
 c) Activating said at least one target light emitter 12 and reading said target light detectors 22.
 d) Determining a plurality of target pixels among said pixels of said digital image and obtaining each of said target pixels from said reading of said target light detectors 22.

An iteration of the method comprises the steps a) to d), so that after a plurality of iterations all the image pixels of the digital image are obtained, thus obtaining said microscopic digital image of the sample 31.

Figure 6A:
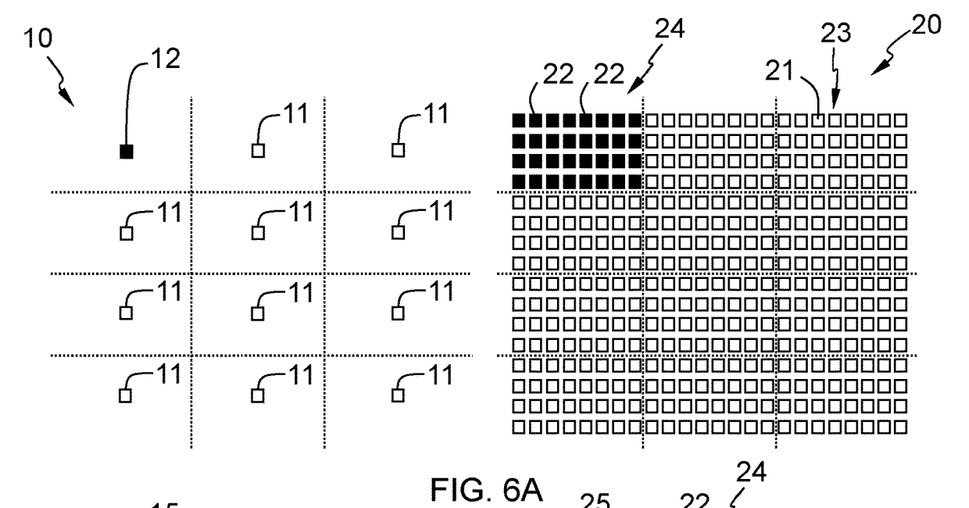
FIGS. 6A, 6B and 6C are schematic representations of the target light emitters and target light detectors used in different iterations of a method for obtaining a microscopic digital image according to one embodiment of the invention. The emission module is parallel and facing towards the detection module, so that corresponding elements follow a specular distribution between both modules.
Figure 6B:
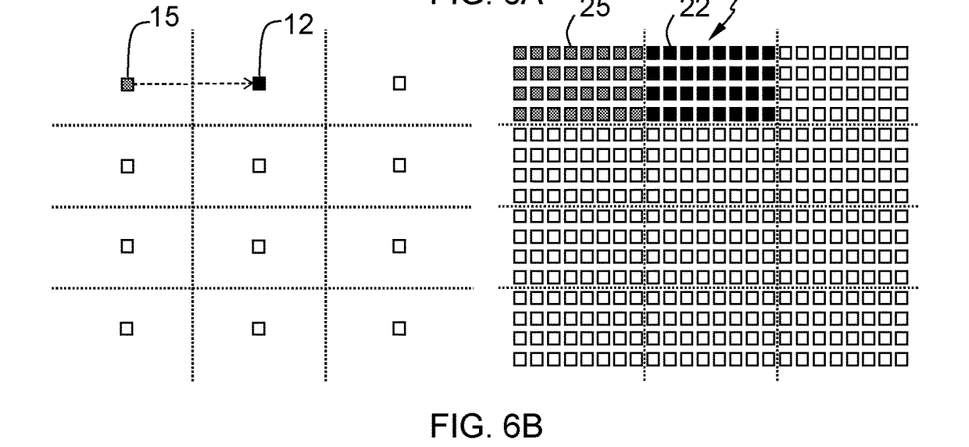
Figure 6C:
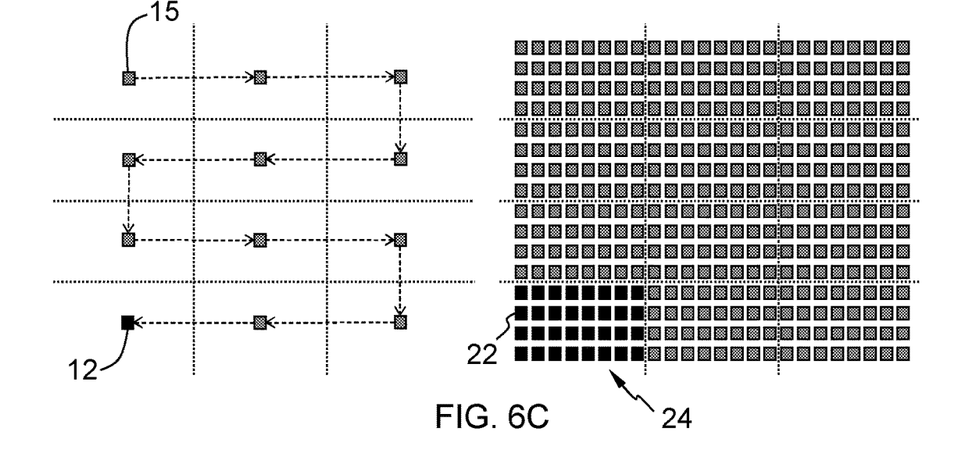

FIGS. 6A, 6B and 6C show different iterations of the method used in the first embodiment. For the first exemplary embodiment, in each iteration, only one target light emitter 12 and only one corresponding target detection zone 24 are used. Nevertheless, a plurality of target detection zones 24 are determined throughout the method, in this case, a different target detection zone 24 is determined for each iteration, so that the total number of target detection zones 24 is the same that the total number of iterations of the method. FIG. 6A shows the first iteration: one target light emitter 12 and a corresponding target detection zone 24 are determined. The target light emitter 12 and the target light detectors 22 of the detection zone 24 are shown in black. Notice that in the figures, for the sake of clarity, not all the elements are labelled with numeric references. The emission module 10 is shown on the left of the figures and the detection module 20 on the right. Since both modules are facing each other, a specular representation has been chosen. FIG. 6B shows the second iteration, the new target light emitter 12 and target light detectors 22 are again shown in black. The already used light emitter 15 from the previous iteration is shown in grey, as well as the already used light detectors 25. The lines with arrows connecting the light emitters 11 show the evolution between different iterations. FIG. 6C shows the 12$^{th}$ and final iteration of the method of the first example. This number of iterations is just a simplification, at it has been discussed above, the real detection module 20 used in the first exemplary embodiment has 2100×2100 light detectors 21, distributed in 7×7 detection zones 23, so that a total of 49 detection zones 23 are used, each having 300×300 light detectors 21. The real number of iterations is, therefore, also 49 for the first embodiment, even if, for the sake of clarity, the simplified figures only show 12.

In the first embodiment, the control means has a static predefined sequence stored in-chip by means of shift registers between the plurality of target light emitters 12 of consecutive iterations of the method, in particular, there is a shift register connecting the light emitters 11 of the emission module 10 that is configured to sequentially activate each of the light emitters 11. This way, each the target light emitter 12 in an iteration is activated sequentially from the target light emitter 12 in the previous iteration.

Figure 10:
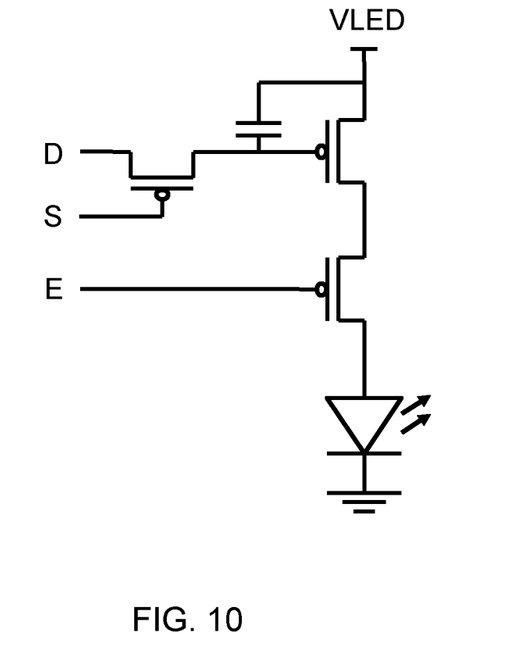
FIG. 10 shows an example of a powering circuit for a LED used in a micro-display according to the state of the art.
Figure 11:
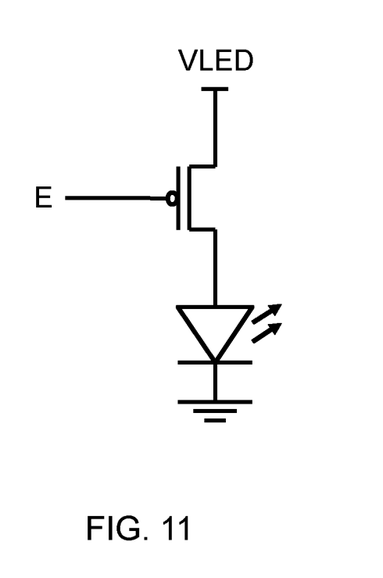
FIG. 11 shows an example of a simplified powering circuit for a LED that can be used with the device of the invention.
Figure 12:
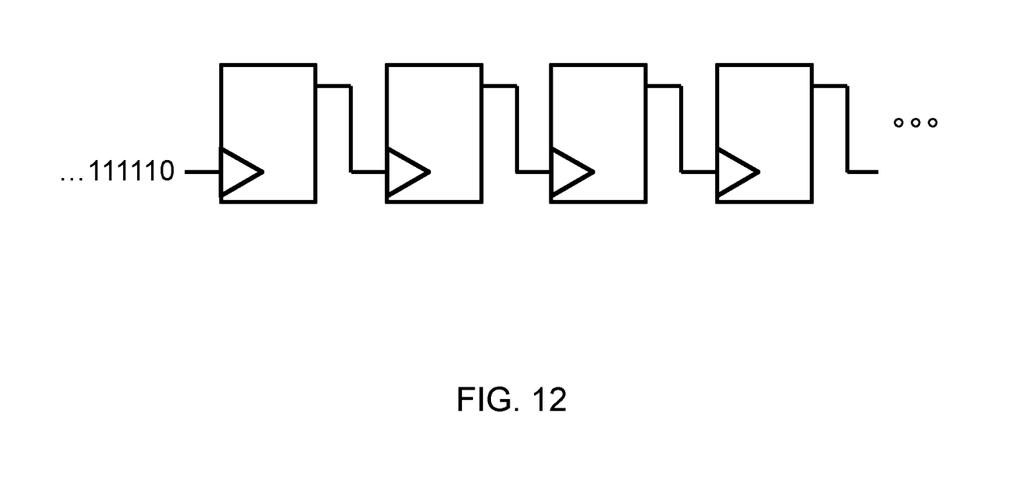
FIG. 12 shows a schematic circuit representation of an embodiment of the control means arranged for sequential activation of the target light emitters using a shift register based on flip-flop elements.

FIG. 10 shows a typical powering and activation circuit for a LED of a micro-display array using PMOS transistors. VLED is the voltage needed for activating the LED. The inputs are often named as data (D), select (S), and enable (E). The capacitor is used for prolonging the activation of the LED during a certain time. FIG. 11 shows the equivalent circuit in the case of the first embodiment of the device, which can be greatly simplified because the activation does not longer need to use capacitors. In this case, the shift register is configured to sequentially activate each of the light emitters 11 following the zig-zag path shown in FIG. 6A to 6C. As it is shown in FIG. 12, the shift register is activated by a digital input. A zero value in the E input of FIG. 11 allows the passage of current through the PMOS transistor and activates the LED. In the next iteration the shift register transmits the zero value to the following flip-flop element and activates the following LED.

Figure 13:
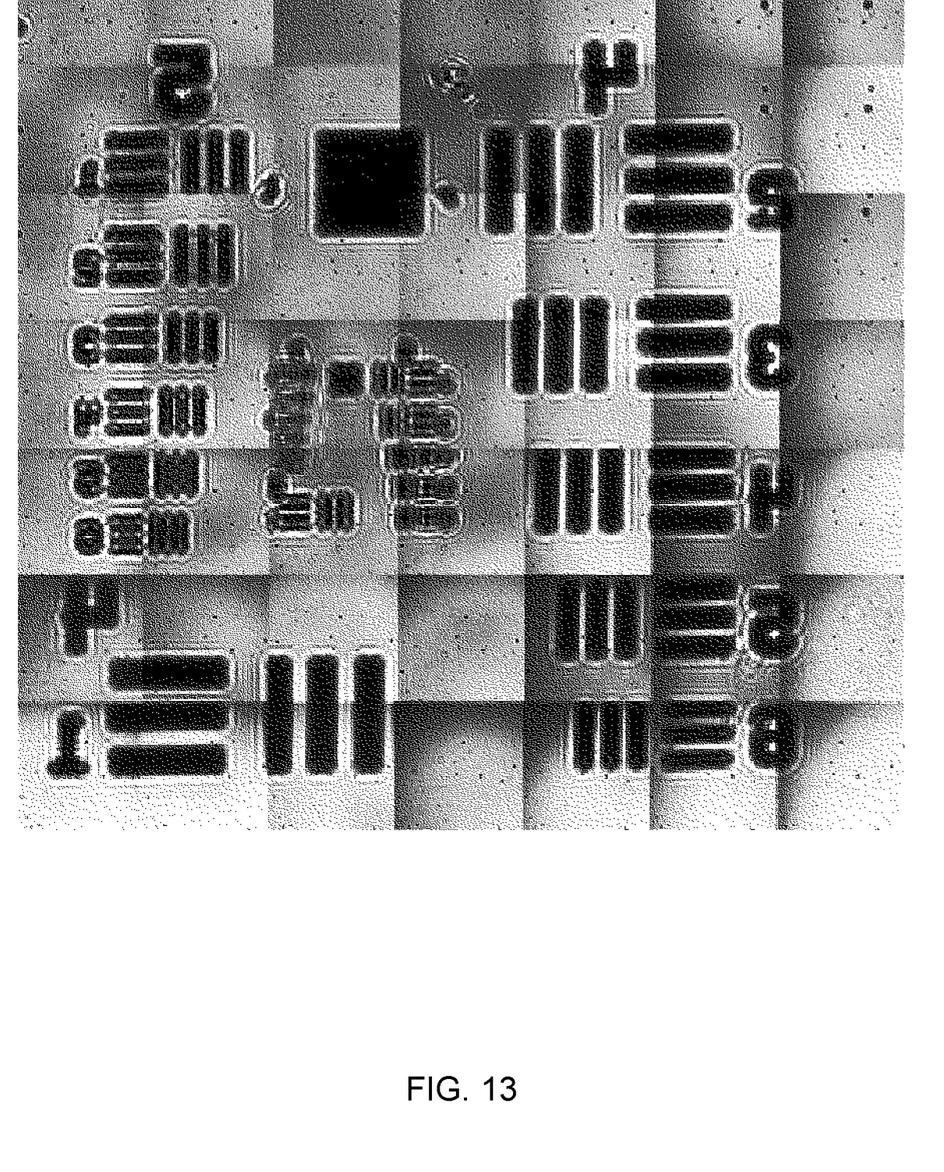
FIG. 13 shows an example of a digital image of a sample obtained with the device of the invention.

FIG. 13 shows an example of a digital image obtained with the first embodiment of the invention. For the sake of clarity in the figures, the resulting image has been post-processed in order to improve the luminance and contrast. The sample 31 used is a reference used to compare the result with the real content. Diffraction bands are clearly shown and can be post-processed in order to obtain a final usable microscopic image.

Other embodiments of the device according to the invention are disclosed hereinafter. These embodiments share most of the features disclosed in the first embodiment above. Therefore, only the differentiating features will be described in detail. For the sake of brevity, common features shared with the first embodiment disclosed above will not be described again hereinbelow.

Figure 7A:
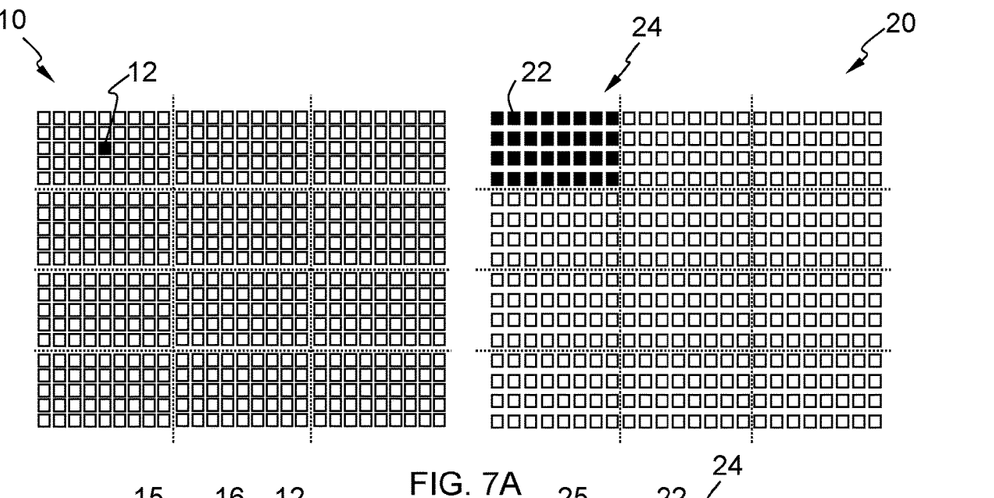
FIGS. 7A, 7B and 7C are schematic representations of the target light emitters and target light detectors used in different iterations of a method for obtaining a microscopic digital image according to another embodiment of the invention where the emission module has more light emitters than the ones effectively used by the method and wherein the faulty emitter in the second iteration is replaced by another one having a correct behaviour.
Figure 7B:
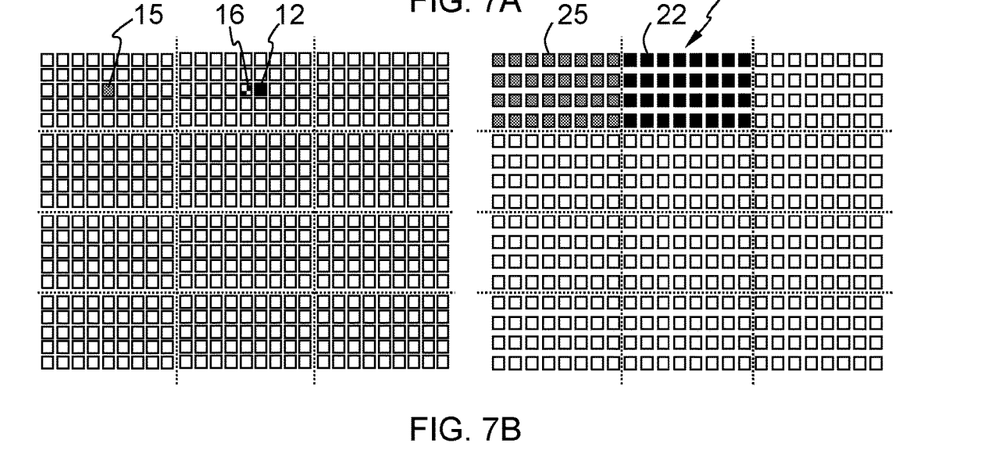
Figure 7C:
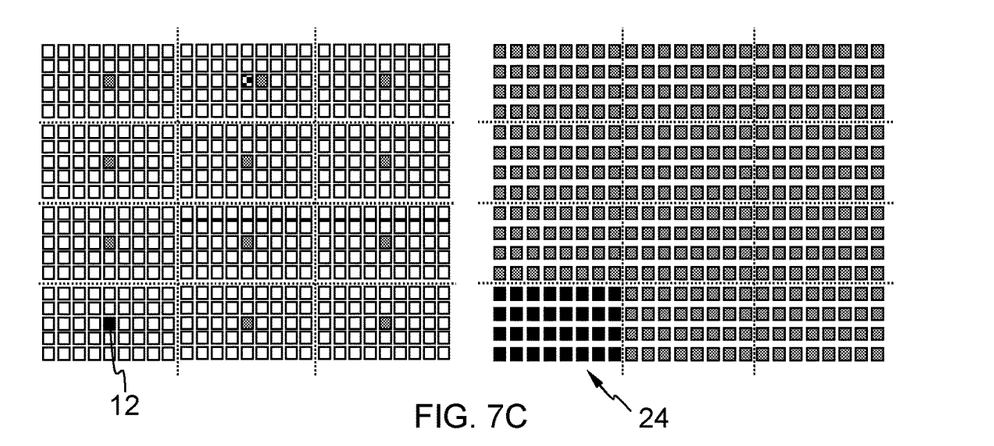

In a second embodiment shown in FIG. 7A to 7C, only a subset of the light emitters 11 of the emission module 10 are determined as target light emitters 12 in the method. In this case, the emission module 10 is a LED microdisplay. FIG. 7A shows the first iteration wherein the target light emitter 12 is determined as the one centred regarding to the target detection zone 24. FIG. 7B shows the second iteration, in this case the light emitter that is more centred is a faulty emitter 16, it cannot be used, and it is disregarded. Therefore, the method determines another target light emitter 12 which is more centred once the faulty emitter 16 has been disregarded. The method continues until the final iteration shown in FIG. 7C. This type of emission module 10 may also be envisaged for other embodiments of the invention, for example, starting from those shown in FIGS. 8A-8C and 9A-9B.

Figure 8A:
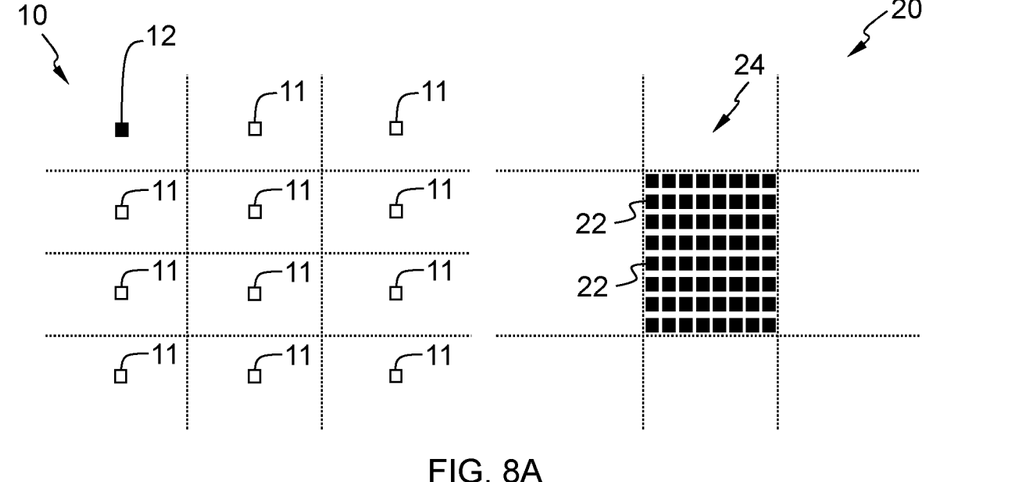
FIGS. 8A, 8B and 8C are schematic representations of the target light emitters and target light detectors used in different iterations of a method for obtaining a microscopic digital image according to another embodiment of the invention where the same target detection zone is used for all the iterations.
Figure 8B:
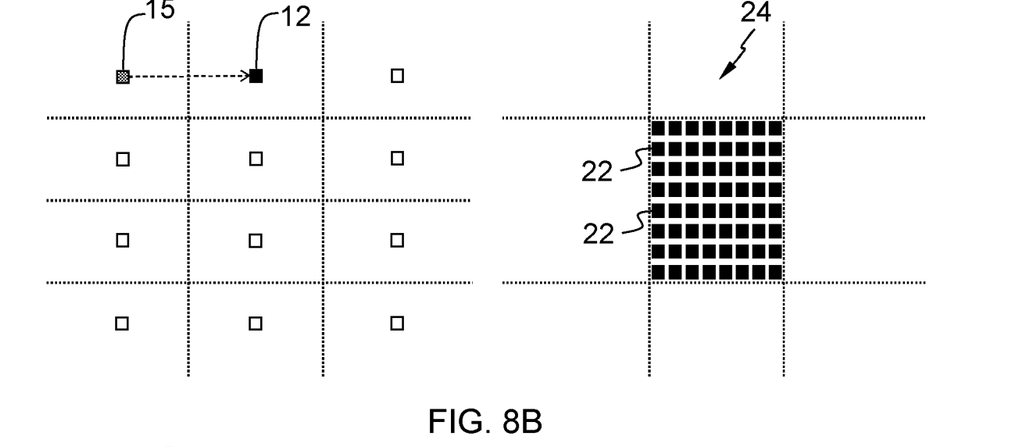
Figure 8C:
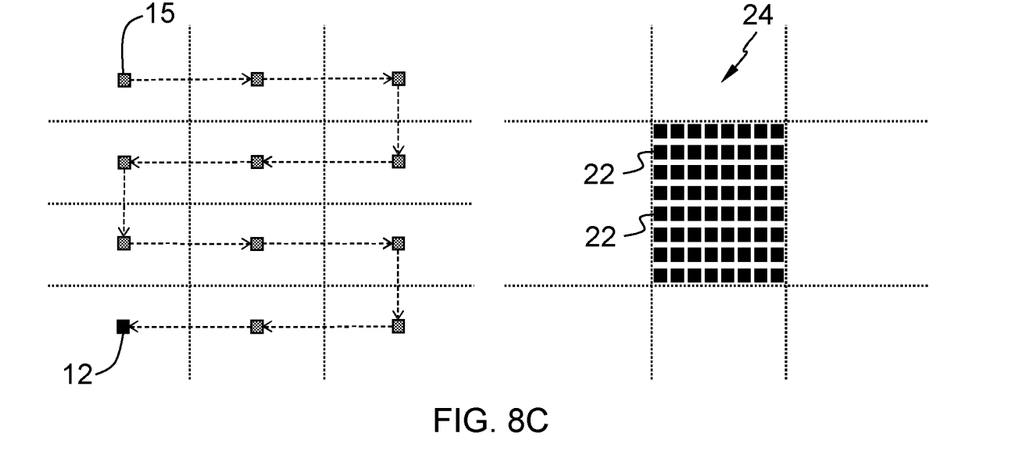

In a third embodiment shown in FIG. 8A to 8C, the target detection zone 24 is determined as the same target detection zone 24 in all of the plurality of iterations of the method. Indeed, the target detection zone is the same in all the figures, even if the target light emitters 12 follow a zigzag pattern through the iterations.

Figure 9A:
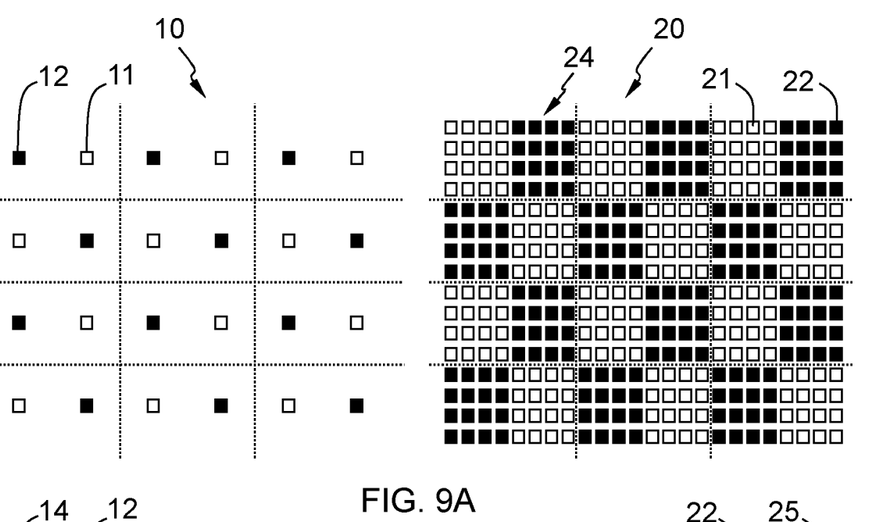
FIGS. 9A and 9B are schematic representations of the target light emitters and target light detectors used in different iterations of a method for obtaining a microscopic digital image according to another embodiment of the invention where a several target light emitters are activated in each iteration.
Figure 9B:
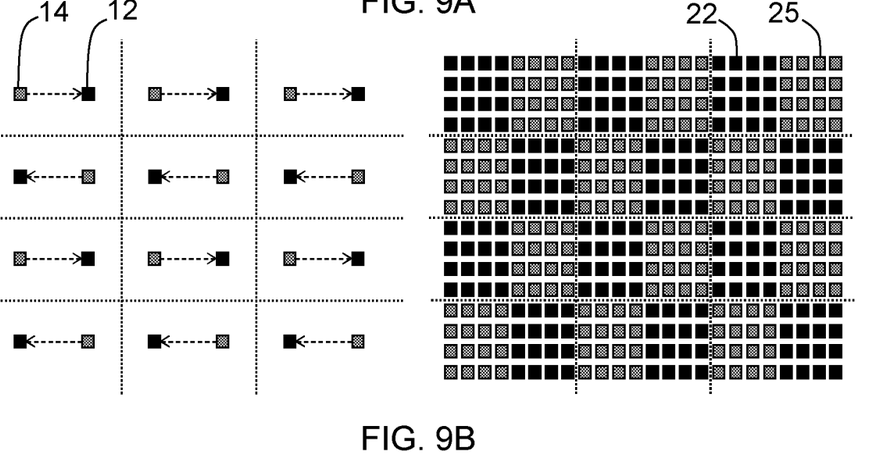

In a fourth embodiment shown in FIG. 9A to 9C, in each iteration, a plurality of target light emitters 12 and a plurality of target detection zones 24 are used in each iteration, as in the first embodiment, each target detection zone 24 corresponds one-to-one to one of the target light emitters 12. This embodiment greatly reduces the amount of iterations, the simplified representation in the figures show only two iterations. In this case it is a preferred option not to use a single shift register, but a plurality of shift registers. In the case of the figures, a shift register is arranged between each of the target light emitters in FIG. 9A and the next target light emitter in FIG. 9B.

In a fifth embodiment, the target pixels are obtained by further compensating the light fall-off received in said target detectors 22. This compensation is done by means of a previous calibration step wherein the method is performed without a sample arranged in said observation zone 30, so that the relative value of each pixel of the digital image obtained in said calibration step contains information about said light fall-off.

In a sixth embodiment, each of said plurality of light detectors 21 is a Single Photon Avalanche Diode. Other photodetectors may also be envisaged, for example, using CCD or CMOS technologies.

In a seventh embodiment, light concentration means are arranged on top of each of the light detectors 21 for concentrating an incident light towards each respective light detector 21, each of said light concentration means are a micro-lens. Light concentration means may also be envisaged on top of each light emitter 11.

In an eight embodiment, the control means is software-driven instead of using an in-chip implementation using shift registers.

In a ninth embodiment, the device 1 also has a transporting tape having a self-adherent side and arranged through the observation zone 30 and the through channel 42. The transporting tape is configured for adhering the sample 31 thereto in the self-adherent side. The device further has dragging means, in particular a roller, that are configured for dragging said transporting tape though said observation zone 30, so that the sample 31 adhered thereto is dragged to the observation zone 30.

In a tenth embodiment, the device 1 has suction means at one end of the through channel 42, configured for driving the sample 31 to said observation zone 30 by suction from the other end of the through channel 42.

The invention claimed is:

1. Method for obtaining a microscopic digital image comprising a plurality of M×N pixels, wherein said method makes use of:

an emission module, comprising a plurality of emission zones, each emission zone comprising a plurality of light emitters;

a detection module arranged parallel and opposite to said emission module, and comprising a plurality of light detectors;

an observation zone, arranged between said emission module and said detection module, and configured for receiving a sample; and a control means comprising a static predefined sequence stored in-chip and a shift register for each of said emission zones configured to sequentially activate each of the light emitters of said emission zone;

wherein the method comprises:

arranging said sample in said observation zone;

determining a target detection zone of said detection module comprising a plurality of m×n target light detectors being the light detectors of said detection module that are arranged in said target detection zone; and repeating the following steps:

a) determining one target light emitter among said light emitters of said emission module;

b) determining said target detection zone comprising said m×n target light detectors;

c) activating said target light emitter and reading said m×n target light detectors; and d) determining a plurality of m×n target pixels among said M×N pixels of said digital image and obtaining each of said m×n target pixels from said reading of said m×n target light detectors;

wherein an iteration of the method comprises said steps a) to d), so that after a plurality of iterations all the image pixels of said digital image are obtained, thus obtaining said microscopic digital image of said sample;

wherein, in each iteration, the position of said m×n target pixels among said M×N pixels of said digital image is determined by the relative position of said target light emitter of said iteration in respect to the plurality of target light emitters of all the iterations, so that the number of pixels of the digital image obtained depends on the number of target light detectors of the target detection zone multiplied by the total number of target light emitters of all the iterations.

2. Method for obtaining a microscopic digital image comprising a plurality of M×N pixels, wherein said method makes use of:

an emission module, comprising a plurality of emission zones, each emission zone comprising a plurality of light emitters;

a detection module arranged parallel and opposite to said emission module, and comprising a plurality of M×N light detectors; and an observation zone, arranged between said emission module and said detection module, and configured for receiving a sample;

a control means comprising a static predefined sequence stored in-chip and a shift register for each of said emission zones configured to sequentially activate each of the light emitters of said emission zone;

wherein said detection module is divided in P×Q detection zones, each detection zone comprising m×n light detectors, and each pixel of said M×N pixels of said digital image corresponding one-to-one to one of said M×N light detectors;

wherein the method comprises arranging said sample in said observation zone and repeating the following steps:

a) determining at least one target light emitter among said light emitters of said emission module;
b) determining at least one target detection zone as at least one of said P×Q detection zones of said detection module, each target detection zone corresponding to one of said at least one target light emitter, and comprising a plurality of m×n target light detectors being the light detectors of said detection module that are arranged in said target detection zone;
c) activating said at least one target light emitter and reading said target light detectors; and
d) determining a plurality of m×n target pixels among said M×N pixels of said digital image as the m×n pixels corresponding to said m×n target light detectors and obtaining each of said m×n target pixels from said reading of said corresponding target light detector;
wherein an iteration of the method comprises said steps a) to d), so that after a plurality of iterations all the M×N image pixels of said digital image are obtained, thus obtaining said microscopic digital image of said sample.

3. Method according to claim 2, wherein in each iteration, said at least one target light emitter comprises only one target light emitter, and said at least one target detection zone comprises only one target detection zone, wherein a plurality of target detection zones are determined throughout the method.

4. Method according to claim 2, wherein in each iteration, said at least one target light emitter comprises a plurality of target light emitters, and said at least one target detection zone comprises a plurality of target detection zones, each of said target detection zone corresponding one-to-one to one of said target light emitter.

5. Method according to claim 3, wherein the target light emitter corresponding to a target detection zone is centred regarding said target detection zone.

6. Method according to claim 1, wherein only a subset of the light emitters of the emission module are determined as target light emitters in the method.

7. Method according to claim 1, wherein said sample is arranged closer to said emission module than to said detection module.

8. Device for obtaining microscopic digital images, wherein the device comprises:
an emission module, comprising a plurality of emission zones, each emission zone comprising a plurality of light emitters;
a detection module arranged parallel and opposite to said emission module, and comprising a plurality of light detectors;
an observation zone, arranged between said emission module and said detection module, and configured for receiving a sample; and
a control means comprising a static predefined sequence stored in-chip and a shift register for each of said emission zones configured to sequentially activate each of the light emitters of said emission zone, wherein the control means is configured for driving the device to:
determine a target detection zone of said detection module comprising a plurality of m×n target light detectors being the light detectors of said detection module that are arranged in said target detection zone; and
repeat the following steps:
a) determine one target light emitter among said light emitters of said emission module;
b) determine said target detection zone comprising said m×n target light detectors;
c) activate said target light emitter and read said m×n target light detectors; and
d) determine a plurality of m×n target pixels among said M×N pixels of said digital image and obtain each of said m×n target pixels from said reading of said m×n target light detectors;
wherein an iteration comprises said steps a) to d), so that after a plurality of iterations all the image pixels of said digital image are obtained, thus obtaining said microscopic digital image of said sample;
wherein, in each iteration, the position of said m×n target pixels among said M×N pixels of said digital image is determined by the relative position of said target light emitter of said iteration in respect to the plurality of target light emitters of all the iterations, so that the number of pixels of the digital image obtained depends on the number of target light detectors of the target detection zone multiplied by the total number of target light emitters of all the iterations.

9. Device according to claim 8, wherein the device further comprises:
a transporting tape, arranged through said observation zone; and configured for adhering said sample thereto; and
dragging means, configured for dragging said transporting tape though said observation zone, so that said sample adhered thereto is dragged to said observation zone.

10. Device according to claim 8, wherein the device further comprises suction means, configured for driving said sample to said observation zone by suction.

11. Device according to claim 8, wherein said observation zone has a volume of a size that allows said sample to freely enter said observation zone.

12. Device according to claim 8, wherein said device comprises a first plate and a second plate, attached to one another and forming through channel; wherein one of said emission module and said detection module is provided in said first plate and the other of said emission module and said detection module is provided in said second plate, so that said observation zone is located in said through channel.

* * * * *